(12) United States Patent
McCormick

(10) Patent No.: US 11,028,706 B2
(45) Date of Patent: Jun. 8, 2021

(54) CAPTURED COMPLIANT COIL SEAL

(71) Applicant: Rolls-Royce Corporation, Indianapolis, IN (US)

(72) Inventor: Kelly Jon McCormick, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 161 days.

(21) Appl. No.: 16/285,327

(22) Filed: Feb. 26, 2019

(65) Prior Publication Data

US 2020/0271003 A1 Aug. 27, 2020

(51) Int. Cl.
F02C 7/28 (2006.01)
F01D 9/02 (2006.01)
F23R 3/60 (2006.01)

(52) U.S. Cl.
CPC ............ F01D 9/023 (2013.01); F02C 7/28 (2013.01); F23R 3/60 (2013.01); F05D 2240/55 (2013.01)

(58) Field of Classification Search
CPC .... F01D 9/023; F02C 7/28; F23R 3/60; F05D 2240/55
See application file for complete search history.

(56) References Cited

U.S. PATENT DOCUMENTS

| 5,797,723 | A | 8/1998 | Frost et al. |
| 6,199,871 | B1 | 3/2001 | Lampes |
| 6,652,229 | B2 | 11/2003 | Lu |
| 9,957,827 | B2 * | 5/2018 | Davis ................ F16J 15/104 |
| 2010/0307166 | A1 | 12/2010 | Woodcock et al. |
| 2011/0179798 | A1 | 7/2011 | Pieussergues et al. |
| 2012/0306166 | A1 | 12/2012 | Melton et al. |
| 2014/0248120 | A1 | 9/2014 | Graves |
| 2015/0184528 | A1 * | 7/2015 | Belsom ................ F23R 3/60 60/800 |

FOREIGN PATENT DOCUMENTS

| EP | 2 589 757 A2 | 5/2013 |
| EP | 3 284 910 A2 | 2/2018 |

OTHER PUBLICATIONS

European Extended Search Report for corresponding application No. 20192868.6 dated Jan. 26, 2021 (9 pages).

* cited by examiner

Primary Examiner — Steven M Sutherland
(74) Attorney, Agent, or Firm — Brinks Gilson & Lione

(57) ABSTRACT

A combustor seal system for a gas turbine engine is provided that includes a rear inner discharge nozzle (RIDN) configured to engage a liner of a combustor. The system further includes a nozzle guide vane (NGV) positioned adjacent the RIDN. The NGV and the RIDN together define a cavity. The system further includes a seal in contact with the RIDN and positioned in the cavity. The seal curves along a surface of the cavity and contacts the RIDN at a first point and a second point in the cavity. The seal contacts the NGV at a third point.

20 Claims, 8 Drawing Sheets

CAPTURED COMPLIANT COIL SEAL

TECHNICAL FIELD

This disclosure relates to combustor systems and, in particular, to combustor seal systems.

BACKGROUND

Present combustor sealing systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, a combustor seal system for a gas turbine engine is provided that includes a rear inner discharge nozzle (RIDN) configured to engage a liner of a combustor. The system further includes a nozzle guide vane (NGV) positioned adjacent the RIDN. The NGV and the RIDN together define a cavity. The system further includes a seal in contact with the RIDN and positioned in the cavity. The seal curves along a surface of the cavity and contacts the RIDN at a first point and a second point in the cavity. The seal contacts the NGV at a third point.

In another example, a combustor seal assembly for a gas turbine engine is provided that includes a seal comprising a first end, a second end, and a seal body extending between the first end and the second end. The assembly further includes a rear inner discharge nozzle (RIDN) comprising an upstream portion and a downstream portion relative to a primary flow path of the gas turbine engine. The assembly further includes a nozzle guide vane (NGV). The NGV is positioned adjacent the RIDN, the RIDN and the NGV together defining a cavity. The seal is positioned in the cavity. The seal curves along a surface of the cavity. The seal contacts the upstream portion of the RIDN at a first point and a second point, and the seal contacts the NGV at a third point.

In yet another example, a method of assembly of a combustor seal system is provided. A rear inner discharge nozzle (RIDN) is provided, the RIDN comprising an upstream portion and a downstream portion relative to a primary flow path of a gas turbine engine. A seal is positioned on the RIDN, the seal comprising a first end, a second end, and a seal body extending between the first end and the second end. A nozzle guide vane (NGV) and the RIDN are positioned adjacent to each other, the RIDN and the NGV together defining a cavity. The seal is positioned in the cavity and curves along a surface of the cavity. The seal contacts the upstream portion of the RIDN at a first point and a second point. The seal contacts the NGV at a third point.

One interesting feature of the systems and methods described herein may be to limit or prevent cooling fluid, such as air, from flowing into a combustion chamber. Such systems and methods include a rear inner discharge nozzle, a nozzle guide vane, and a seal positioned to prevent airflow between the rear inner discharge nozzle and the nozzle guide vane. Because the rear inner discharge nozzle and the nozzle guide vane often move with respect to each other, conventional seals are often exposed to wear from rubbing. Additionally, conventional systems require multiple sealing pieces, which increase the number of potential failure points and the number of potential air leakage points.

Figure 1:
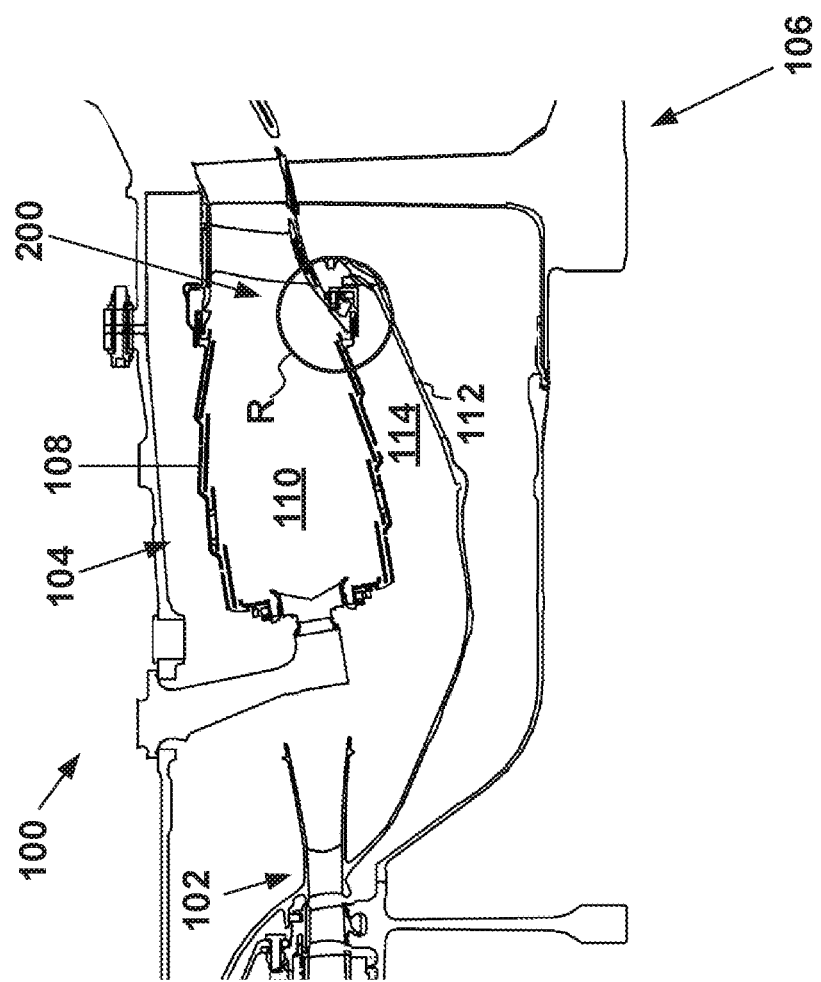
FIG. 1 illustrates a cross-sectional view of an example of a portion of a gas turbine engine including a combustor seal system.

FIG. 1 is a cross-sectional view of a portion of gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section (not shown), a compressor section 102, a combustion section 104, a turbine section 106, and an exhaust section (not shown). During operation of the gas turbine engine 100, fluid received from the intake section, such as air, may be compressed within the compressor section 102. The compressed fluid may then be mixed with fuel and the mixture may be burned in the combustion section 104. The combustion section 104 may include any suitable fuel injection and combustion mechanisms. The hot, high pressure fluid may then pass through the turbine section 106 to extract energy from the fluid and cause a turbine shaft of a turbine in the turbine section 106 to rotate, which in turn drives the compressor section 102. Discharge fluid may exit the exhaust section.

The combustor section 104 includes a combustor 108, which defines a combustion chamber 110. The combustor 108 and a combustion rear inner casing 112 define a second chamber 114, which may contain some of the compressed fluid received from the compressor section 102. The gas turbine engine 100 may include a system 200 for sealing the combustor 108 of the gas turbine engine 100 positioned between the combustion section 104 and the turbine section 106. The system 200 may prevent or limit the flow of fluid from the second chamber 114 to the combustion chamber 110.

Figure 2:
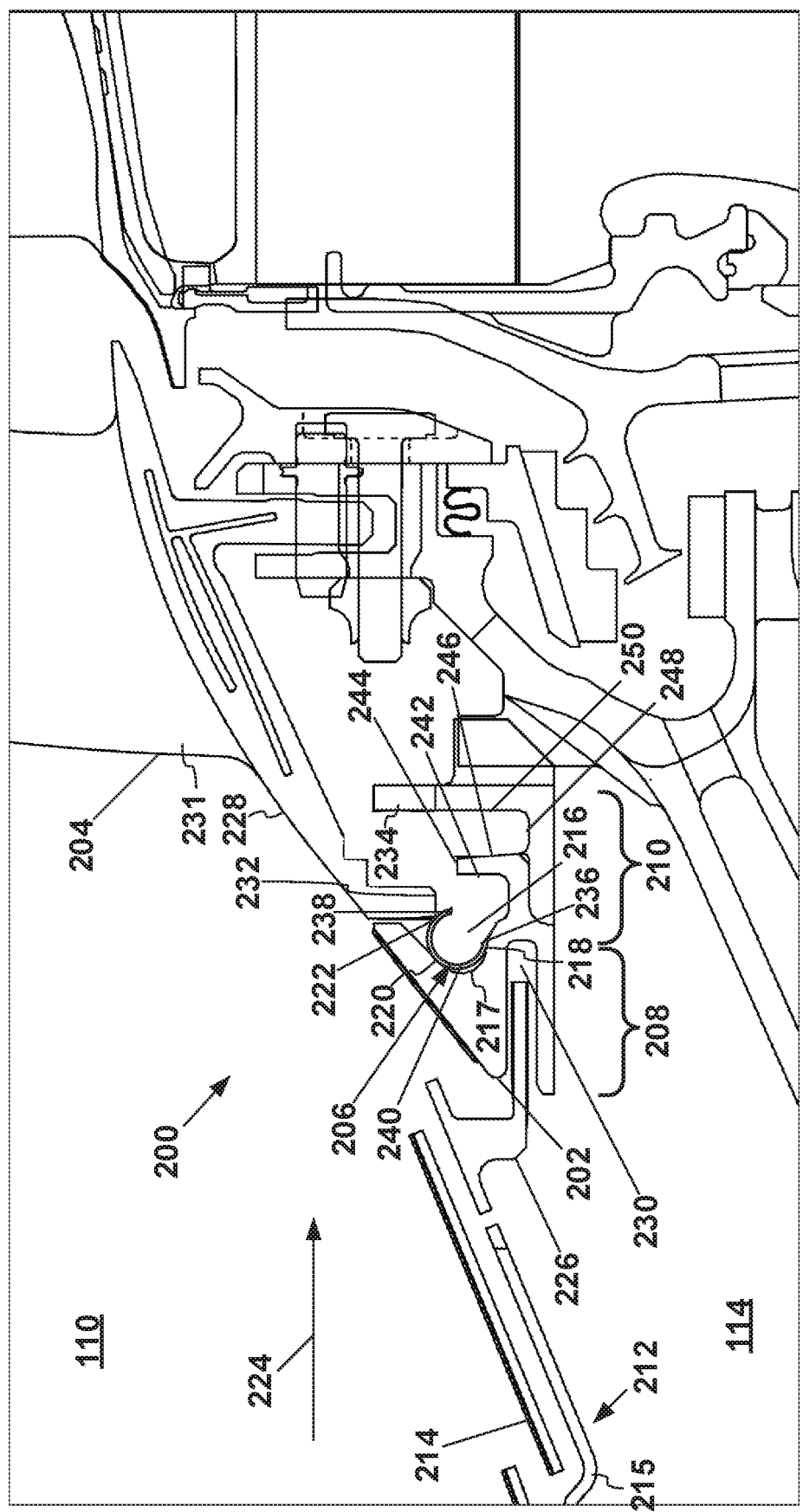
FIG. 2 illustrates a cross-sectional view of an example of the combustor seal system.

FIG. 2 illustrates in more detail the circled region labelled R in FIG. 1. In particular, FIG. 2 illustrates a cross-sectional view of a first example of the system 200 for sealing the combustor 108 of the gas turbine engine 100. The example of the system 200 illustrated in FIG. 2 includes a rear inner discharge nozzle (RIDN) 202, a nozzle guide vane (NGV) 204, and a seal 206. The RIDN 202 may include an upstream portion 208 relative to a primary flow path 224 of the gas turbine engine 100 and a downstream portion 210 relative to the primary flow path 224 of the gas turbine engine 100. The upstream portion 208 may be positioned to engage a liner 212 of the combustor 108. The NGV 204 may be positioned adjacent to the downstream portion 210 of the RIDN 202, where the NGV 204 and the RIDN 202 together define a cavity 216. The seal 206 is positioned in the cavity 216, and the seal 206 curves along a surface 217 of the cavity 216. In the first example, the seal 206 contacts the RIDN 202 at a first point 218 and a second point 220, and the seal contacts the NGV 204 at a third point 222. In other examples, the seal 206 may contact each of the RIDN 202 and the NGV 204 in two or more points, respectively.

The liner 212 of the combustor 108 may be any wall that houses combustion of the gas turbine engine. In the first example, as shown in FIG. 2, the liner 212 may be a double-walled liner having an inner wall 214 and an outer wall 215. The inner wall 214 and the outer wall 215 may be segmented. As shown in FIG. 2, multiple segments of the inner wall 214 may be staggered with respect to multiple segments of the outer wall 215. The inner wall 214 may include clearance between each segment, and the outer wall 215 may also include clearance between each segment. Alternatively or in addition, there may be clearance between the inner wall 214 and the outer wall 215 allowing cooling fluid, such as air, to flow through the liner 212. In the first example, the liner 212 may also include an inner end wall 226 positioned at the downstream end of the liner 212. In another example, the inner wall 214 and/or the outer wall 215 may be unsegmented pieces. In yet another example, the liner 212 may include only a single wall, which may be segmented or unsegmented.

The NGV 204 may be any annular structure positioned to guide fluid, such as air, from the combustor 107 toward the turbine section 106 of the gas turbine engine 100. In one example, the NGV 204 may include an inner platform 228, an outer platform (not shown), and a stator 231 extending between the inner platform 228 and the outer platform. The inner platform 228 of the NGV 204 may include an inner upstream edge 232 relative to the primary flow path 224 of the gas turbine engine 100. In the first example, the third point 222 may be positioned on the inner upstream edge 232 of the NGV 204. In other examples, the third point 222 may be positioned along alternate portions of the inner platform.

The RIDN 202 may be any annular sealing structure positioned to add radial and axial support to the liner 212 and the NGV 204. The RIDN 202 may extend across a gap between an inner end wall 226 of the liner 212 and the inner platform 228 of the NGV 204. In one example, as shown in FIG. 2, the RIDN 202 may include a groove 230 in the upstream portion 208 for receiving the inner end wall 226. In other examples, the groove 230 may be configured to receive any portion of the liner 212. The downstream portion 210 of the RIDN 202 may include a projection that extends toward a midline of the combustion chamber 110. The projection includes a first side 242 facing upstream, a second side 244 facing toward the midline of the combustion chamber 110, and a third side 246 facing downstream. As shown in FIG. 2, the downstream portion 210 of the RIDN 202 may include a tang 234. The tang 234 may assist in positioning the seal 206 in the RIDN 202 and the NGV 204. In some examples, the RIDN 202 may include other positioning features. In other examples, the RIDN 202 may not include the tang 234 or other positioning features. The RIDN 202 may be configured to allow both the liner 212 and the NGV 204 to move axially and radially relative to the RIDN 202. Alternatively or in addition, the RIDN 202 may be configured to move axially and radially with respect the liner 212 and/or the NGV 204.

The seal 206 may be any curved and/or coiled device positioned to prevent a flow of air between the RIDN 202 and the NGV 204. The seal 206 may be a coil seal. The seal 206 may be configured to prevent or limit the flow of air between the combustion chamber 110 and the second chamber 114. In the example shown in FIG. 2, the seal 206 includes a first end 236, a second end 238, and a seal body 240 extending between the first end 236 and the second end 238, the seal body 240 curving along the surface 217 of the cavity 216. In the first example, the first end 236 may be positioned adjacent the first point 218. In other examples, the seal body 240 may extend along the RIDN 202 downstream of the first point 218. The seal 206 may be configured to bend causing a distance between the second end 238 and the first point 218 to change. In the first example, the seal 206 may be fixed to the RIDN 202 at the first point 218. In other examples, the seal 206 may be fixed at the first point 218, the second point 220, the third point 222, or any other point. The seal 206 may extend radially from the first point 218, the second point 220, and the third point 220, contacting the RIDN 202 and the NGV 204 along an entire length of the seal 206. The seal 206 may fixed to the RIDN 202 by brazing or any other type of fastening. In still other examples, the seal 206 may not be fixed to any point of the RIDN 202 or the NGV 204.

The tang 234 may extend downstream from the third side 246 of the RIDN 202. The tang 234 may include a first edge 248 extending from the third side 246 and a second edge 250 extending from the first edge 248. The second edge 250 may extend towards the NGV 204. In one example, the RIDN 202 and the tang 234 may be one continuous piece. In other examples the RIDN 202 and the tang 234 may be separate pieces coupled together.

During operation of the system 200, fluid, such as air flows in the direction of the primary flow path 224 from the compressor section 102, through the combustion section 104, toward the turbine section 106. In some examples, there may be a pressure differential between the combustion chamber 110 and the second chamber 114, where the combustion chamber 110 has a lower pressure than the second chamber 114. Because of the pressure differential between the combustion chamber 110 and the second chamber 114, the fluid is urged from the second chamber 114 toward the combustion chamber 110. The fluid may flow along the RIDN 202 and/or the NGV 204 toward the cavity 216. The fluid may contact the seal 206, causing the seal 206 to press against the RIDN 202 and the NGV 204 at the first point 218, the second point 220, and the third point 222, and preventing or limiting the fluid from flowing into the combustion chamber 110. An increase in fluid pressure against the seal 206 may cause the distance between the second end 238 and the first point 218 to increase. A decrease in fluid pressure against the seal 206 may cause the distance between the second end 238 and the first point 218 to decrease.

The seal 206 may expand and/or contract as the RIDN 202 moves axially and/or radially with respect to the NGV 204. Alternatively or in addition, the seal 206 may expand and/or contract as the NGV 204 moves axially and/or radially with respect to the RIDN 202.

Figure 3:
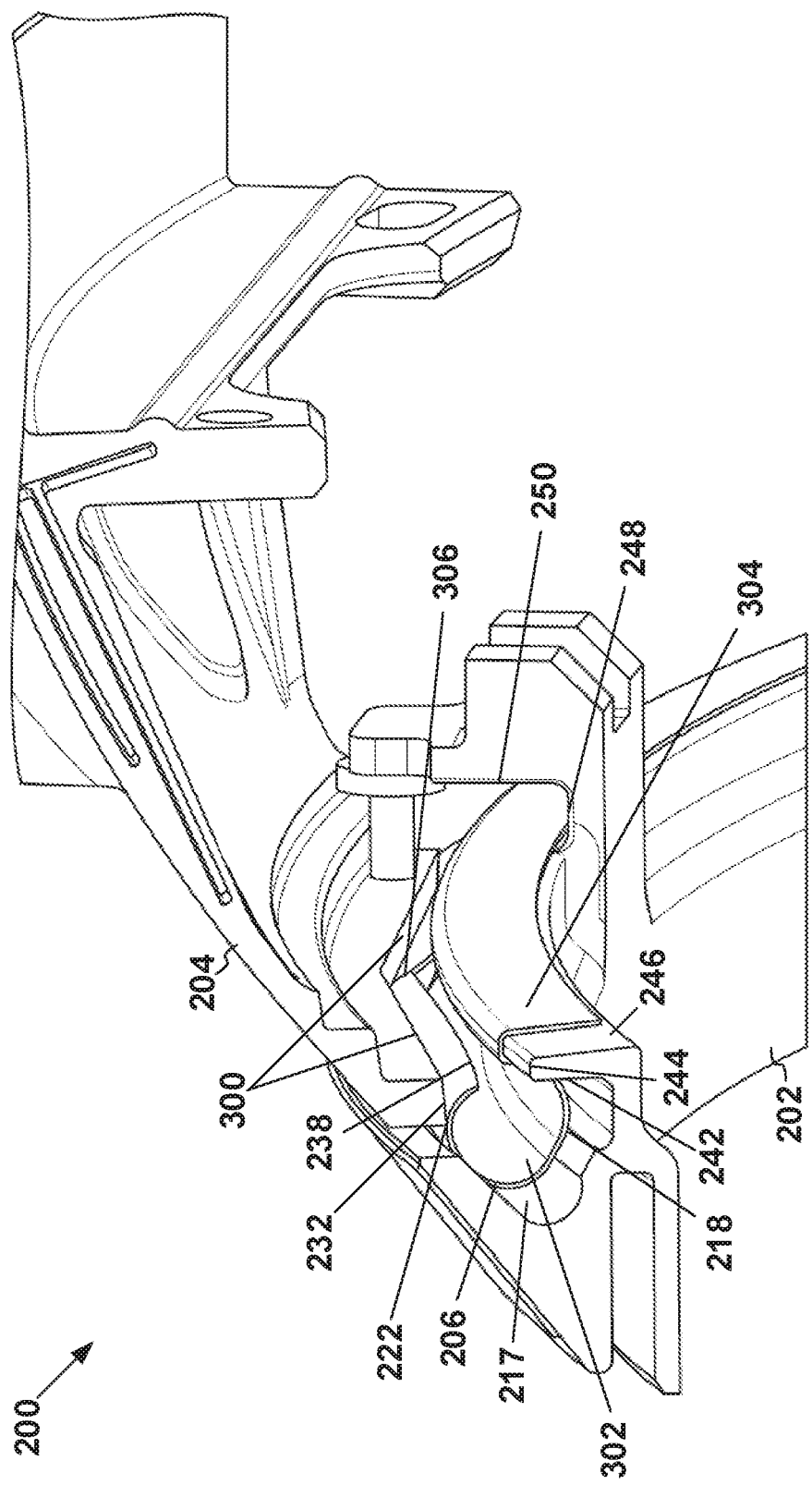
FIG. 3 illustrates a perspective view of another example of the combustor seal system.

FIG. 3 illustrates an example of the system 200 in which the inner upstream edge 232 of the NGV 204 comprises at least one flat section 300. Two of the flat sections 300 are shown in FIG. 3. The flat section 300 may be any flat surface formed in the NGV 204, such as a cord of an arc. In some examples, as shown in FIG. 3, the inner upstream edge 232 may include multiple flat sections 300. In other examples, the inner upstream edge 232 may include only one flat section 300.

In the example shown in FIG. 3, the seal 206 includes a first portion 302 and a second portion 304. The first portion 302 may curve along the surface 217 of the cavity 216 from the second end 238 to the first point 218. In some examples, the second portion 304 may extend along the first side 242, the second side 244, and the third side 246. The seal 206 may be affixed to the RIDN 202 at, for example, a point on the first side 242, the second side 244, and/or the third side 246. In other examples, the seal 206 may extend along the surface 217 of the cavity 216 from the second end 238 and along the first side 242 and then terminate. Alternatively, the seal 206 may extend further still along the second side 244 of the downstream portion 210 of the RIDN 202 and terminate.

As shown in FIG. 3, the seal 206 may also include at least one slot 306 at the second end 238. The slot 306 may be any gap formed in the seal body 240 that allows the seal 206 to bend and accommodate curved geometries of the RIDN 202 and the NGV 204. The slots may be positioned perpendicular to the inner upstream edge 232 of the NGV 204, extending upstream of the NGV 204. The seal 206 may extend along the inner upstream edge 232. The slot 306 may be positioned along the inner upstream edge 232 between two of the flat sections 310 that are adjacent to each other.

Figure 4:
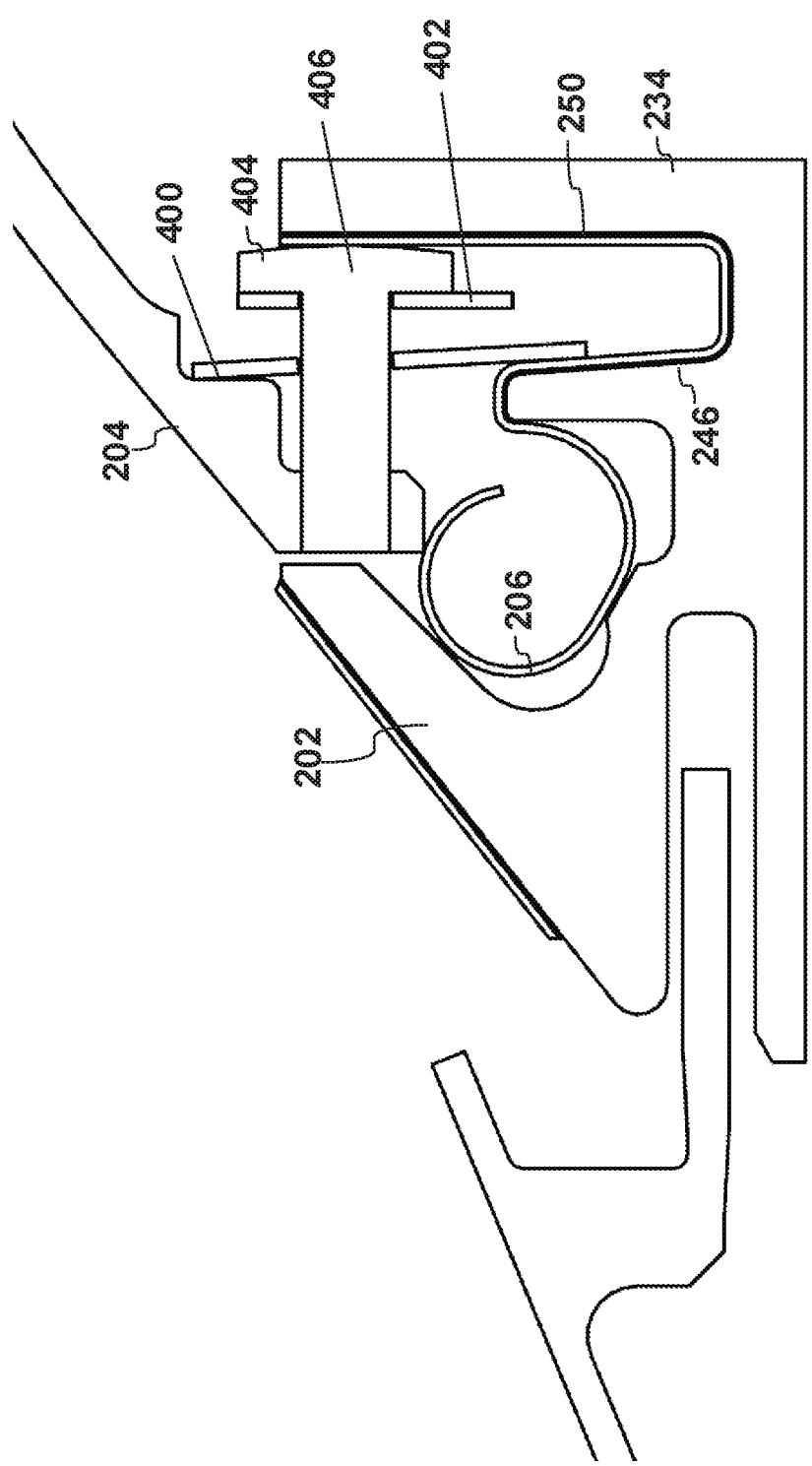
FIG. 4 illustrates a cross-sectional view of another example of the combustor seal system.

FIG. 4 illustrates an example of the system 200 that includes a flap seal 400, a spring 402, an attachment pin 404, and the seal 206. The spring 402 may be positioned downstream of the flap seal 400, and the attachment pin 404 may extend through the spring 402 and the flap seal 400, coupling the spring 402 and the flap seal 400 to the NGV 204.

The flap seal 400 may be any structure extending between the downstream portion 210 of the RIDN 202 and the NGV 204. The flap seal 400 may further prevent and/or limit the flow of air between the combustion chamber 110 and the second chamber 114. The flap seal 400 may be positioned to contact the NGV 204 and a portion of the seal 206 extending along the third side 246 of the downstream portion 210 of the RIDN 202. In some examples, as shown in FIG. 4, the seal 206 extends between the third side 246 of the of the RIDN 202 and the flap seal 400, the flap seal 400 contacting both the seal 206 and the NGV 204. In this example, the seal 206 may be configured to prevent and/or limit wear on the flap seal 400. In other examples, the flap seal 400 may directly contact the RIDN 202.

The spring 402 may be any device configured to keep the flap seal 400 in contact with the NGV 204 and the RIDN 202. The spring 402 may be positioned between the flap seal 400 and a head 406 of the attachment pin 404. The spring 402 may contact the flap seal 400 and the head 406 of the attachment pin 404.

The attachment pin 404 may be any fastener configured to couple the spring 402 and the flap seal 400 to the NGV 204. The attachment pin 404 may include the head 406 and shaft 408 extending upstream from head 406 and through the spring 403 and the flap seal 400. In some examples, such as is shown in FIG. 4, the seal 206 extends along an entire length of the second edge 250 of the tang 234. In this example, the seal 206 extends between and contacts the head 406 of the attachment pin 404 and the second edge 250. In such an arrangement, the seal 206 may limit wear on the head 406 of the attachment pin 404 and/or the tang 234. Even if the seal 206 wears, it may be more cost effective to replace the seal 206 than the attachment pin 404. In other examples, where the seal 206 does not extend along the entire length of the second edge 250, the head 406 may contact the second edge 250 of the tang 234 directly.

During operation of the system 200, as the RIDN 202 and the NGV 204 move radially and/or axially, the spring 402 may apply a force to the flap seal 400 causing the flap seal 400 to keep constant contact with the RIDN 202 and the NGV 204. If fluid moves into the cavity 216 through gaps between the flap seals 400, or if the flap seal 400 otherwise fails, the seal 206 may expand and/or contract when contacted by the fluid, preventing and/or limiting a flow of the fluid into the combustion chamber 110. Alternatively or in addition, as the RIDN 202 and NGV 204 move with respect to each other, the seal 206 may limit surface-to-surface wear of the flap seal 400, the tang 234, and the attachment pin 404.

Figure 5:
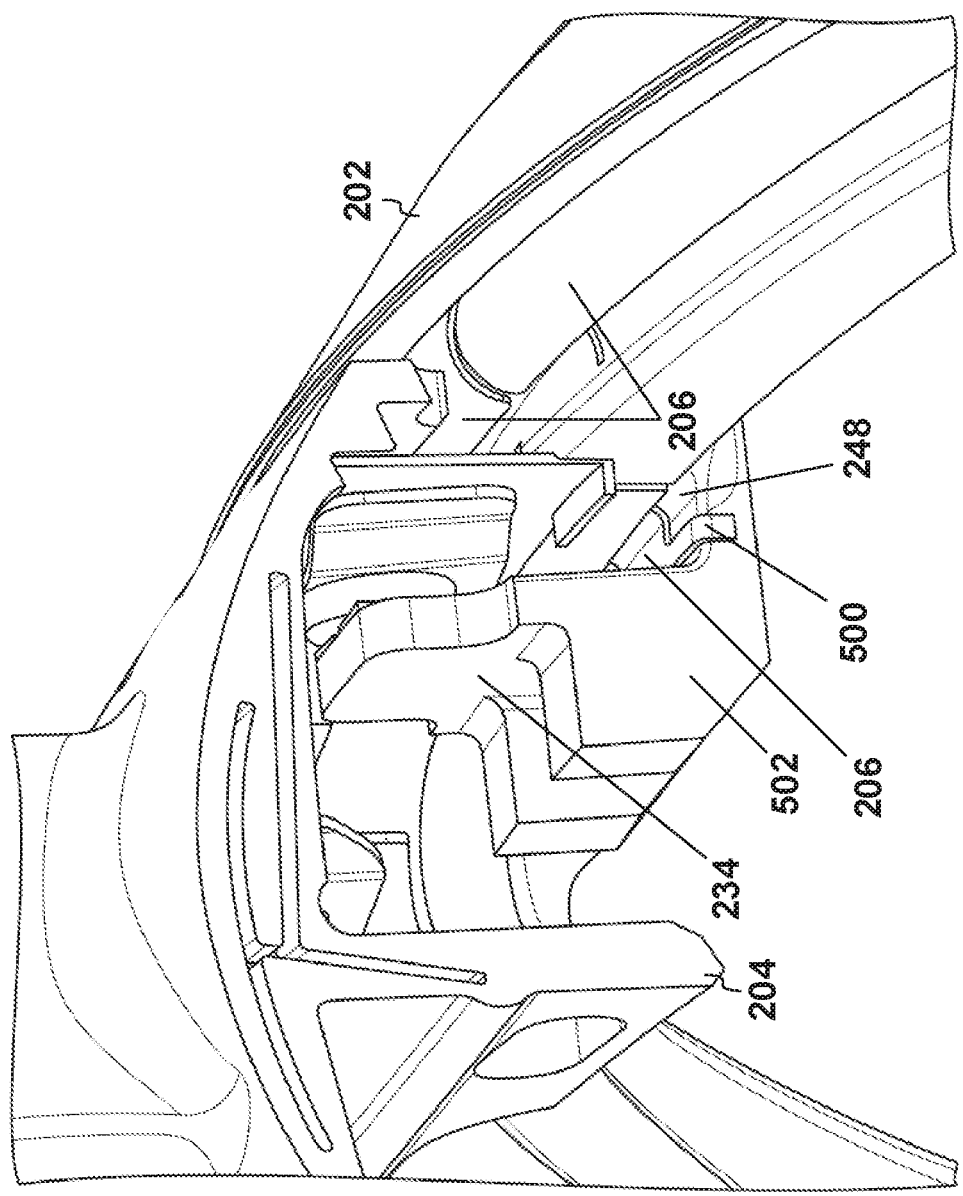
FIG. 5 illustrates a perspective view of the combustor seal system of FIG. 4.
Figure 6:
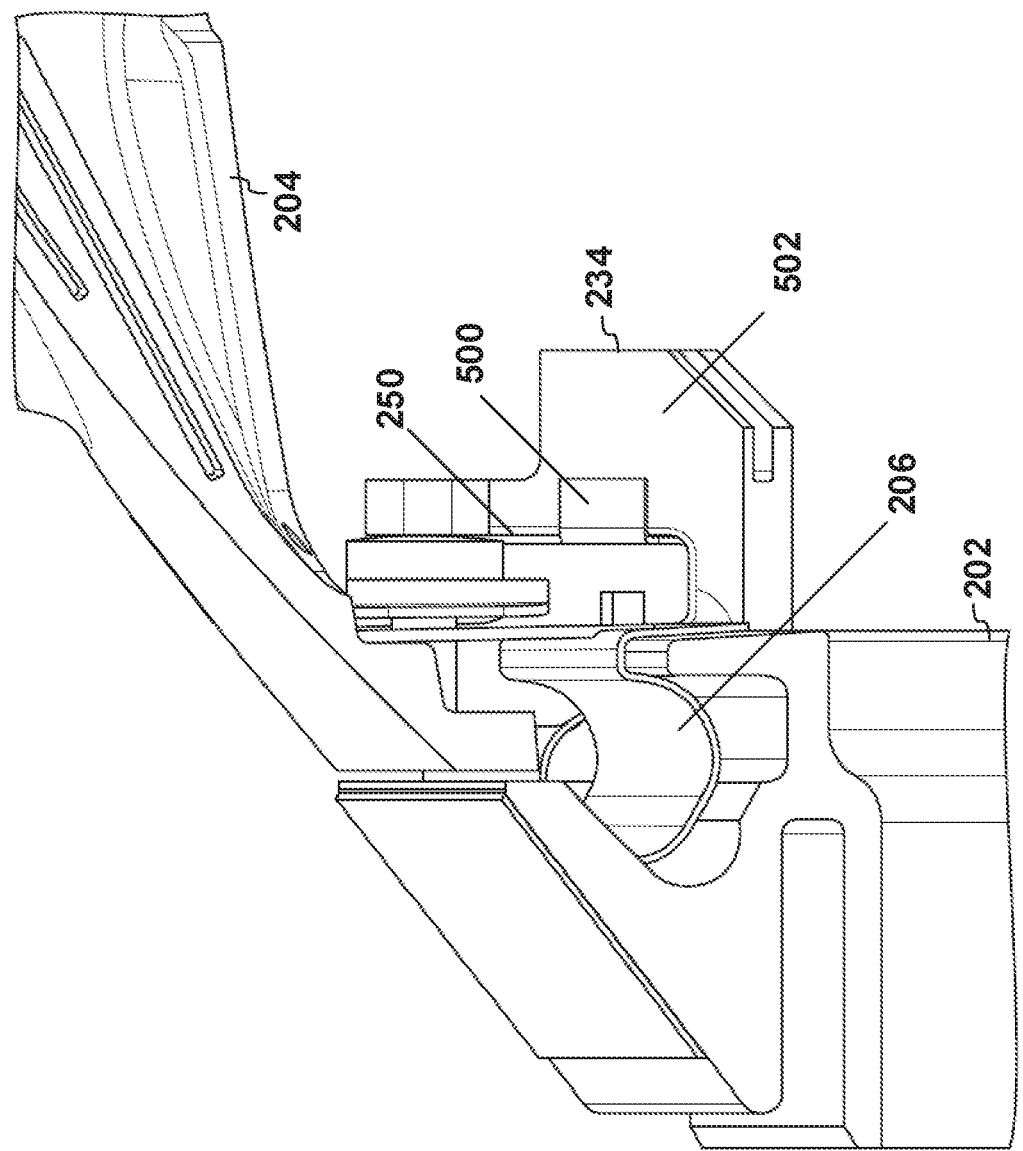
FIG. 6 illustrates a perspective view of another example of the combustor seal system of FIG. 5.

FIGS. 5 and 6 illustrate an example of the system 200 shown in FIG. 4 in which the seal 206 includes at least one tab 500. The tab 500 may be any projection from the seal 206 configured to position the seal 206 on the RIDN 202 by engaging the RIDN 202 and/or the tang 234. As shown in FIGS. 5 and 6, the tab 500 may extend radially outward from the seal 206. The tab 500 may engage a side 502 of the tang 234. In one example, as shown in FIG. 5, the tab 500 may extend along the first edge 248 of the tang 234. In another example, as shown in FIG. 6, the tab may extend along the second edge 250 of the tang 234. In other examples, the tab 500 may extend along and engage the first side 242, the second side 244, and/or the third side 246 of the RIDN 202. Alternatively or in addition, the seal 206 may include multiple tabs 500 extending along opposite sides 502 of the tang 234 (not shown).

During operation, the tab 500 may help in the positioning of the seal 206 when the seal 206 is being attached to the RIDN 202 and/or the NGV 204. In some examples, the tab 500 may add additional support to the seal 206. In other examples, the tab may be removed after the seal 206 is attached to the RIDN 202 and/or the NGV.

Figure 7:
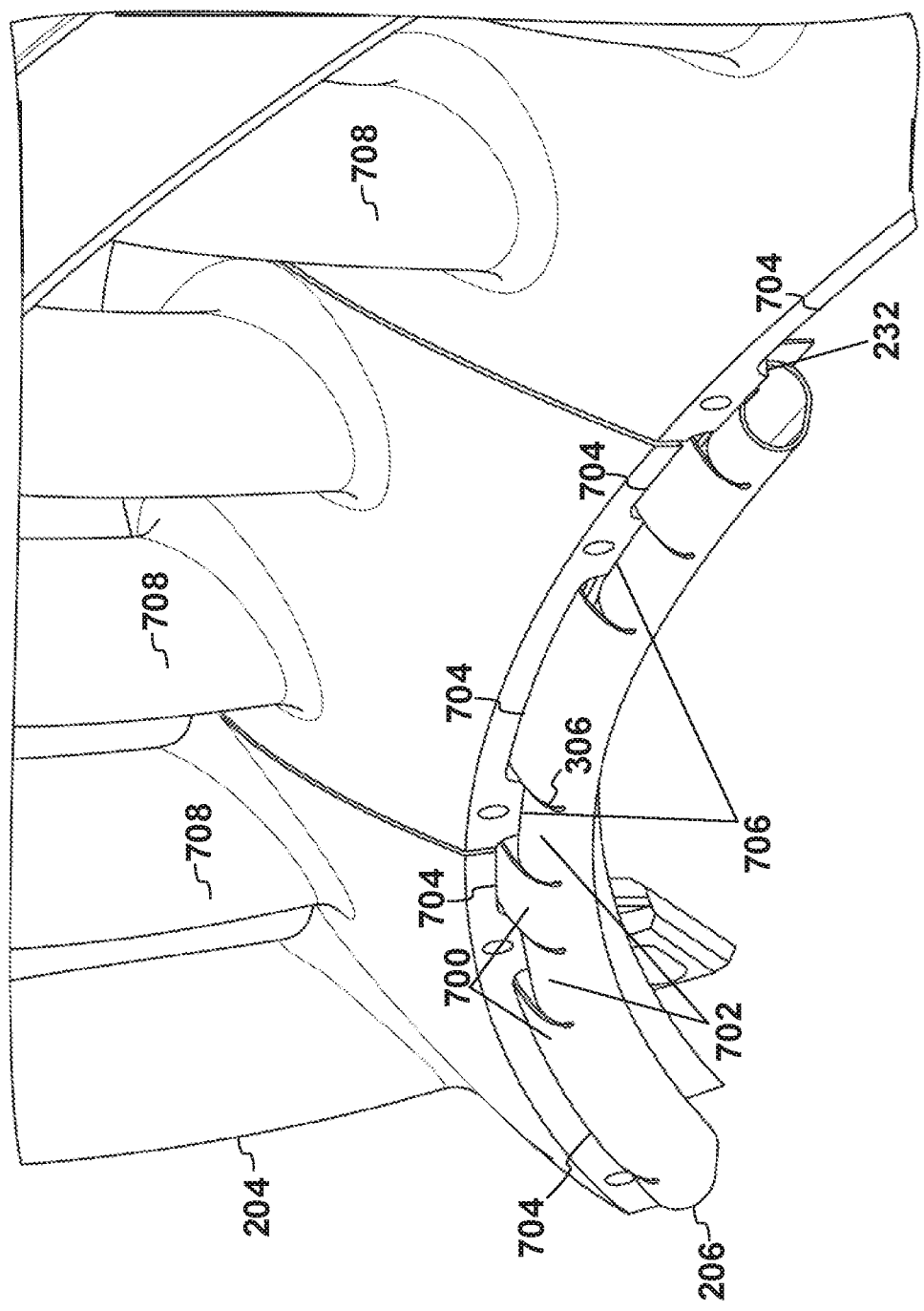
FIG. 7 illustrates a perspective view of another example of the combustor seal system.
Figure 8:
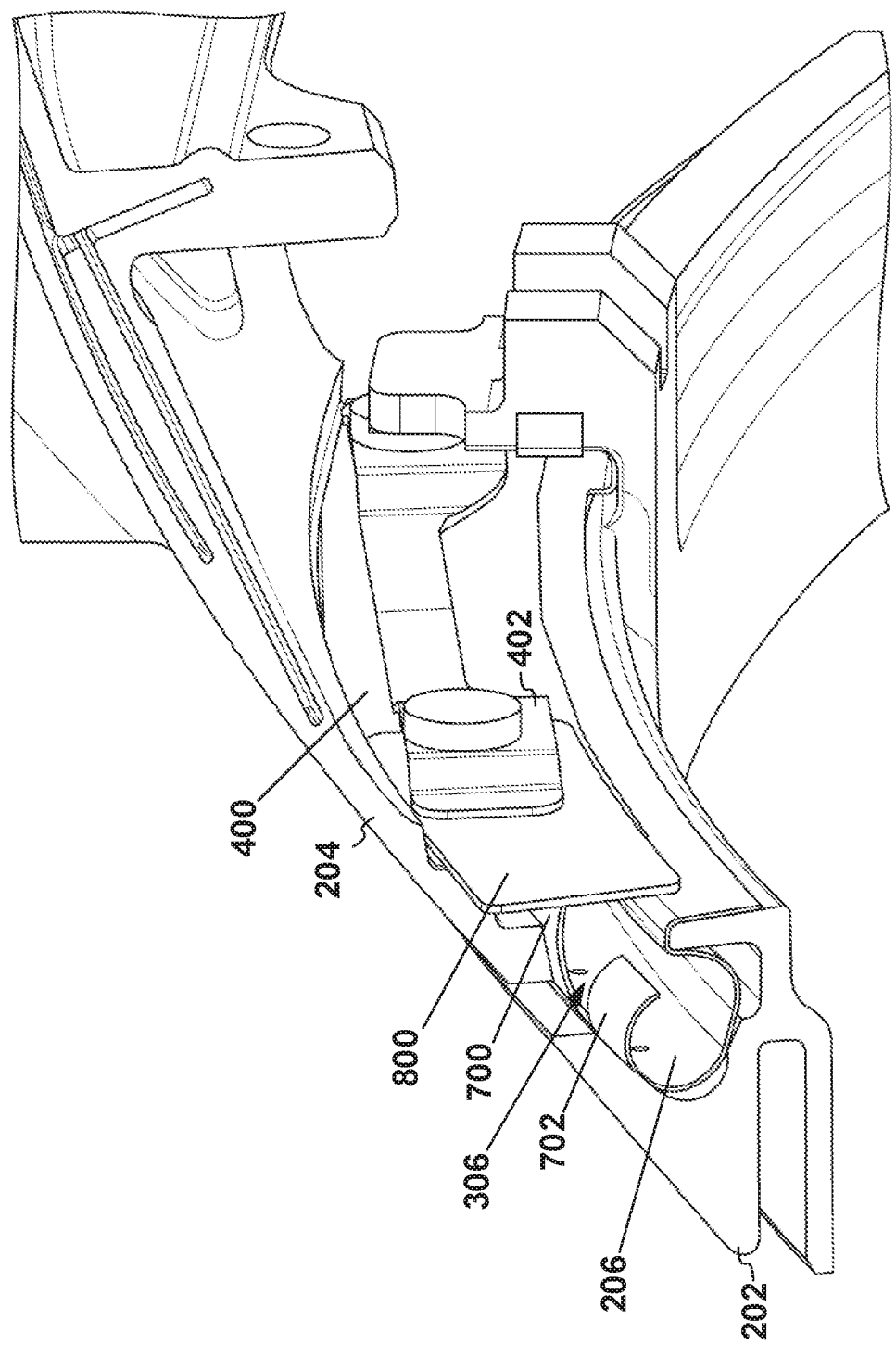
FIG. 8 illustrates another perspective view of the combustor seal system of FIG. 7.

FIGS. 7 and 8 illustrate an example of the system 200 in which the seal 206 includes multiple expanded portions 700 and multiple contracted portions 702, and the inner upstream edge 232 of the NGV 204 includes multiple channels 704. Because the channels 704 are largely hidden from view in FIG. 7, FIG. 7 illustrates a perspective view of the system 200 with the RIDN 202 removed. As shown in FIG. 7, each of the expanded portions 700 may be positioned to contact a respective channel 704. Each of the contracted portions 702 may be positioned to contact a respective portion 706 of the inner upstream edge 232 that is between adjacent channels 704. As shown in FIGS. 7 and 8, the expanded portions 700 and the contracted portions 702 may alternate position along the seal 206. A respective slot 306 may be positioned between respective expanded portions 700 and contracted portions 702.

As shown in FIG. 7, the NGV 204 may include multiple segments 708 coupled together. The RIDN 202 and the seal 206 may also include multiple segments. In some examples, as shown in FIG. 7, multiple segments 708 of the NGV 204 may be positioned adjacent one segment of the seal 206. Alternatively or in addition, multiple segments 708 of the NGV 204 may be positioned adjacent one segment of the RIDN 202. In other examples, the system 200 may include an equal number of segments of the RIDN 202, segments of the seal 206, and segments 708 of the NGV 204.

As shown in FIG. 8, the system 200 may include an overlap plate 800. The overlap plate 800 may be any sealing plate positioned to overlap two adjacent flap seals 400. The overlap plate 800 may be positioned between the flap seal 400 and the spring 402. The overlap plate 800 may be configured to seal a gap between two adjacent flap seals 400 (not shown).

In another example, an assembly may be provided including the RIDN 202, the NGV 204, and the seal 206. The seal 206 may include the first end 236, the second end 238, and the seal body 240 extending between the first end 236 and the second end 238. The RIDN 202 may include the upstream portion 208 and the downstream portion 210 relative to the primary flow path 224 of the gas turbine engine 100. The NGV 204 may be positioned adjacent to the RIDN 202. The RIDN 202 and the NGV 204 together may define the cavity 216. The seal 206 may be positioned in the cavity 216. The seal 206 may curve along the surface 217 of the cavity 216. The seal 206 may contact the upstream portion 208 of the RIDN 202 at the first point 218 and the second point 220, and the seal 206 contacts the NGV 204 the a third point 222.

In yet another example, a method of assembly of the combustor seal system may be provide. The RIDN 202 is provided. The seal 206 may be positioned on the RIDN. The NGV 204 may be positioned adjacent to the RIDN 202, the RIDN 202 and the NGV 204 together defining the cavity 216. The seal 206 is positioned in the cavity 216 and curves along a surface 217 of the cavity 216. The method may further include attaching the seal 206 at the first point 218 and/or the second point 220. In some examples the attaching the seal 206 may include brazing, bolting, resistance welding, and/or tungsten inert gas (TIG) tack welding. Alternatively or in addition, the RIDN 202 may include a slot for receiving a fixed end of the seal 206. In other examples the attaching the seal 206 may include attaching the seal 206 to the tang 234. Alternatively or in addition, the tabs 500 may be provided to aid in the positioning of the seal 206 on the RIDN 202 during the attaching the seal 206. In some examples, the method of assembly may include attaching the flap seal 400, the spring 402, and the overlap plate 800 to the NGV 204 with the attachment pin 404. In other examples, the flap seal 400, the spring 402, the attachment pin 404, and the overlap plate 800 may not be provided.

The system 200 may be implemented with additional, different, or fewer components. For example, the RIDN 202 may be in the shape of a bird mouth, a fish mouth, or any other shape configured to allow positioning of the RIDN 202 between the liner 112 and the NGV 204. In other examples instead of the RIDN 202, the system 200 may include a rear inner combustion liner (RICL) positioned adjacent to the NGV 204. In some examples, the system 200 may include only the seal 206 the RIDN 202, and the NGV 204.

The seal 206 may comprise a material that is capable of withstanding high-temperatures, is resistant to wear, and has high ductility. The material may be a nickel alloy, such as a cobalt-nickel-chromium-tungsten alloy, or any other material having desirable creep capability, ductility, yield strength, temperature capability, wear properties, forming characteristics and cost.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

A first aspect relates to a combustor seal system for a gas turbine engine, the system comprising: a rear inner discharge nozzle (RIDN) configured to engage a liner of a combustor; a nozzle guide vane (NGV) positioned adjacent the RIDN, wherein the NGV and the RIDN together define a cavity; and a seal in contact with the RIDN and positioned in the cavity, wherein the seal curves along a surface of the cavity and contacts the RIDN at a first point and a second point in the cavity, and the seal contacts the NGV at a third point.

A second aspect relates to the system of claim 1, wherein the NGV comprises an inner upstream edge relative to a primary flow path of the gas turbine engine, wherein the seal extends along the inner upstream edge, and wherein the seal contacts the inner upstream edge of the NGV at the third point.

A third aspect relates to the system of any preceding aspect, wherein the inner upstream edge of the NGV comprises at least one flat section, wherein the seal comprises a plurality of slots, and wherein the slots are positioned adjacent opposite ends of the at least one flat section.

A fourth aspect relates to the system of any preceding aspect, wherein the inner upstream edge comprises a plurality of channels, wherein the seal comprises a plurality of contracted portions, a plurality of expanded portions, and a respective slot between each of the contracted and expanded portions, and wherein the expanded portions contact the channels.

A fifth aspect relates to the system of any preceding aspect, wherein the RIDN comprises an upstream portion and a downstream portion relative to a primary flow path of the gas turbine engine, wherein the downstream portion comprises a first side, a second side, and a third side, and wherein the seal extends along at least a portion of the first side, the second side, and the third side.

A sixth aspect relates to the system of any preceding aspect, wherein the RIDN further comprises a tang positioned downstream of the third side relative to the primary flow path of the gas turbine engine, the tang including a first edge extending away from the third side and a second edge extending from the first edge toward the NGV, wherein the seal extends along the first edge.

A seventh aspect relates to the system of any preceding aspect, wherein the seal comprises at least one tab extending radially outward from the seal along the first edge, and wherein the at least one tab extends along at least one side of the tang.

An eighth aspect relates to the system of any preceding aspect, wherein the seal extends along the second edge, wherein the seal comprises at least one tab extending radially outward from the seal along the second edge, and where the at least one tab extends along at least one side of the tang.

A ninth aspect relates to a combustor seal assembly for a gas turbine engine, the assembly comprising: a seal comprising a first end, a second end, and a seal body extending between the first end and the second end; a rear inner discharge nozzle (RIDN) comprising an upstream portion and a downstream portion relative to a primary flow path of the gas turbine engine; and a nozzle guide vane (NGV), wherein the NGV is positioned adjacent the RIDN, the RIDN and the NGV together defining a cavity, wherein the seal is positioned in the cavity, wherein the seal curves along a surface of the cavity, wherein the seal contacts the upstream portion of the RIDN at a first point and a second point, and the seal contacts the NGV at a third point.

A tenth aspect relates to the assembly of aspect nine, wherein the seal body is configured to bend, causing a distance between the second end of the seal and the first point to change.

An eleventh aspect relates to the assembly of any preceding aspects, wherein the seal body comprises a first portion, wherein the first portion is curved.

A twelfth aspect relates to the assembly of any preceding aspect, wherein the seal body further comprises a second portion, wherein the second portion extends along the downstream portion of the RIDN.

A thirteenth aspect relates to the assembly of any preceding aspect, further comprising a flap seal and an attachment pin, wherein the flap seal is positioned between the downstream portion of the RIDN and the NGV, wherein the attachment pin couples the flap seal to the NGV, and wherein the flap seal contacts the NGV and the seal.

A fourteenth aspect relates to the assembly of any preceding aspect, wherein the downstream portion of the RIDN further comprises a tang positioned downstream of the attachment pin, wherein the seal extends along the tang, wherein the attachment pin contacts the seal.

A fifteenth aspect relates to the system of any preceding aspect, wherein the NGV comprises an inner upstream edge relative to the primary flow path of the gas turbine engine, wherein the inner upstream edge includes a plurality of flat sections, wherein the seal includes a plurality of slots, wherein a first slot of the plurality of slots is positioned adjacent a point between two adjacent flat sections of the plurality of flat sections and between, and wherein a second slot of the plurality of slots is positioned adjacent a point between two adjacent segments of the NGV.

A sixteenth aspect relates to a method of assembly of a combustor seal system, the method comprising: providing a rear inner discharge nozzle (RIDN), the RIDN comprising an upstream portion and a downstream portion relative to a primary flow path of a gas turbine engine; positioning a seal on the RIDN, the seal comprising a first end, a second end, and a seal body extending between the first end and the second end; and positioning a nozzle guide vane (NGV) and the RIDN adjacent to each other, the RIDN and the NGV together defining a cavity, wherein the seal is positioned in the cavity and curves along a surface of the cavity, wherein the seal contacts the upstream portion of the RIDN at a first point and a second point, and wherein the seal contacts the NGV at a third point.

A seventeenth aspect relates to the method of the sixteenth aspect, wherein the positioning the seal on the RIDN further comprises attaching the seal to the RIDN at the first point.

A eighteenth aspect relates to the method of any preceding aspect, wherein the downstream portion of the RIDN further comprises a tang, wherein the seal extends along the downstream portion of the RIDN, and wherein the positioning the seal on the RIDN further comprises attaching the seal to the downstream portion of the RIDN.

A nineteenth aspect relates to the method of any preceding aspect, further comprising providing a flap seal, an overlap seal and an attachment pin and attaching the flap seal and the overlap seal to the NGV with the attachment pin, wherein the seal extends along a portion of the tang between the tang and the attachment pin, wherein the flap seal contacts the NGV and the seal, wherein the flap seal includes a first flap seal segment and a second flap seal segment, and wherein the overlap seal is positioned to contact the first and second flap seal segments downstream of the flap seal.

A twentieth aspect relates to the method of any preceding aspect, wherein the seal comprises a tab extending from a downstream portion of the seal, wherein the tab contacts the tang, wherein the tabs are configured to hold the seal in place during the positioning of the seal on the RIDN.

In addition to the features mentioned in each of the independent aspects enumerated above, some examples may show, alone or in combination, the optional features mentioned in the dependent aspects and/or as disclosed in the description above and shown in the figures.

What is claimed is:

1. A combustor seal system for a gas turbine engine, the system comprising:
   a rear inner discharge nozzle (RIDN) configured to engage a liner of a combustor;
   a nozzle guide vane (NGV) positioned adjacent the RIDN, wherein the NGV and the RIDN together define a cavity, wherein the NGV comprises an inner upstream edge relative to a primary flow path of the gas turbine, the inner upstream edge comprising a plurality of channels; and
   a seal in contact with the RIDN and positioned in the cavity, wherein the seal curves along a surface of the cavity and contacts the RIDN at a first point and a second point in the cavity, and the seal contacts the NGV at a third point
   wherein the seal comprises a plurality of contracted portions, a plurality of expanded portions, and a plurality of slots, each slot positioned between a respective one of the contracted portions and a respective one of the expanded portions, and wherein the expanded portions contact the plurality of channels.

2. The system of claim 1, wherein the seal extends along the inner upstream edge, and wherein the seal contacts the inner upstream edge of the NGV at the third point.

3. The system of claim 2, wherein the inner upstream edge of the NGV comprises at least one flat section, and wherein the slots are positioned adjacent opposite ends of the at least one flat section.

4. The system of claim 1, wherein the RIDN comprises an upstream portion and a downstream portion relative to the primary flow path of the gas turbine engine, wherein the downstream portion comprises a first side, a second side, and a third side, and wherein the seal extends along at least a portion of the first side, the second side, and the third side.

5. The system of claim 4, wherein the RIDN further comprises a tang positioned downstream of the third side relative to the primary flow path of the gas turbine engine, the tang including a first edge extending away from the third side and a second edge extending from the first edge toward the NGV, wherein the seal extends along the first edge.

6. The system of claim 5, wherein the seal comprises at least one tab extending radially outward from the seal along the first edge, and wherein the at least one tab extends along at least one side of the tang.

7. The system of claim 5, wherein the seal extends along the second edge, wherein the seal comprises at least one tab extending radially outward from the seal along the second edge, and where the at least one tab extends along at least one side of the tang.

8. A combustor seal assembly for a gas turbine engine, the assembly comprising:
 a seal comprising a first end, a second end, and a seal body extending between the first end and the second end;
 a rear inner discharge nozzle (RIDN) comprising an upstream portion and a downstream portion relative to a primary flow path of the gas turbine engine, wherein the downstream portion comprises a tang positioned downstream an attachment pin, wherein the seal extends along the tang, and wherein the attachment pin contacts the seal; and
 a nozzle guide vane (NGV), wherein the NGV is positioned adjacent the RIDN, the RIDN and the NGV together defining a cavity, wherein the seal is positioned in the cavity, wherein the seal curves along a surface of the cavity, wherein the seal contacts the upstream portion of the RIDN at a first point and a second point, and the seal contacts the NGV at a third point.

9. The assembly of claim 8, wherein the seal body is configured to bend, causing a distance between the second end of the seal and the first point to change.

10. The assembly of claim 8, wherein the seal body comprises a first portion, wherein the first portion is curved.

11. The assembly of claim 10, wherein the seal body further comprises a second portion, wherein the second portion extends along the downstream portion of the RIDN.

12. The assembly of claim 11, further comprising a flap seal positioned between the downstream portion of the RIDN and the NGV, wherein the attachment pin couples the flap seal to the NGV, and wherein the flap seal contacts the NGV and the seal.

13. The assembly of claim 8, wherein the NGV comprises an inner upstream edge relative to the primary flow path of the gas turbine engine, wherein the inner upstream edge includes a plurality of flat sections, wherein the seal includes a plurality of slots, wherein a first slot of the plurality of slots is positioned adjacent a point between two adjacent flat sections of the plurality of flat sections and between, and wherein a second slot of the plurality of slots is positioned adjacent a point between two adjacent segments of the NGV.

14. A method of assembly of a combustor seal system, the method comprising:
 providing a rear inner discharge nozzle (RIDN), the RIDN comprising an upstream portion and a downstream portion relative to a primary flow path of a gas turbine engine;
 positioning a seal on the RIDN, the seal comprising a first end, a second end, and a seal body extending between the first end and the second end;
 positioning a nozzle guide vane (NGV) and the RIDN adjacent to each other, the RIDN and the NGV together defining a cavity, wherein the seal is positioned in the cavity and curves along a surface of the cavity, wherein the seal contacts the upstream portion of the RIDN at a first point and a second point, and wherein the seal contacts the NGV at a third point; and
 attaching a flap seal and an overlap seal to the NGV with an attachment pin, wherein the flap seal contacts the NGV and the seal.

15. The method of claim 14, wherein the positioning the seal on the RIDN further comprises attaching the seal to the RIDN at the first point.

16. The method of claim 14, wherein the downstream portion of the RIDN further comprises a tang, wherein the seal extends along the downstream portion of the RIDN, and wherein the positioning the seal on the RIDN further comprises attaching the seal to the downstream portion of the RIDN.

17. The method of claim 16 wherein the seal extends along a portion of the tang between the tang and the attachment pin, wherein the flap seal includes a first flap seal segment and a second flap seal segment, and wherein the overlap seal is positioned to contact the first and second flap seal segments downstream of the flap seal.

18. The method of claim 16, wherein the seal comprises a tab extending from a downstream portion of the seal, wherein the tab contacts the tang, wherein the tabs are configured to hold the seal in place during the positioning of the seal on the RIDN.

19. A combustor seal assembly for a gas turbine engine, the assembly comprising:
 a seal comprising a first end, a second end, and a seal body extending between the first end and the second end;
 a rear inner discharge nozzle (RIDN) comprising an upstream portion and a downstream portion relative to a primary flow path of the gas turbine engine; and
 a nozzle guide vane (NGV), wherein the NGV is positioned adjacent the RIDN, the RIDN and the NGV together defining a cavity, wherein the seal is positioned in the cavity, wherein the seal curves along a surface of the cavity, wherein the seal contacts the upstream portion of the RIDN at a first point and a second point, and the seal contacts the NGV at a third point, and
 wherein the NGV comprises an inner upstream edge relative to the primary flow path of the gas turbine engine, wherein the inner upstream edge includes a plurality of flat sections, wherein the seal includes a plurality of slots, wherein a first slot of the plurality of slots is positioned adjacent a point between two adjacent flat sections of the plurality of flat sections and between, and wherein a second slot of the plurality of slots is positioned adjacent a point between two adjacent segments of the NGV.

20. A method of assembly of a combustor seal system, the method comprising:
 providing a rear inner discharge nozzle (RIDN), the RIDN comprising an upstream portion and a downstream portion relative to a primary flow path of a gas turbine engine;
 positioning a seal on the RIDN, the seal comprising a first end, a second end, and a seal body extending between the first end and the second end, wherein the seal comprises a tab extending from a downstream portion of the seal, wherein the tab contacts a tang, wherein the tab is configured to hold the seal in place during the positioning of the seal on the RIDN; and positioning a nozzle guide vane (NGV) and the RIDN adjacent to each other, the RIDN and the NGV together defining a cavity, wherein the seal is positioned in the cavity and curves along a surface of the cavity, wherein the seal contacts the upstream portion of the RIDN at a first point and a second point, and wherein the seal contacts the NGV at a third point.

* * * * *